United States Patent [19]
Yonezawa

[11] Patent Number: 6,122,229
[45] Date of Patent: Sep. 19, 2000

[54] MAGNETO-OPTICALLY RECORDED DATA READOUT SYSTEM

[75] Inventor: Seiji Yonezawa, Mejirodai 2-6-11, Hachioji-shi, Tokyo, Japan

[73] Assignee: Seiji Yonezawa, Tokyo, Japan

[21] Appl. No.: 09/185,392

[22] Filed: Nov. 3, 1998

[30] Foreign Application Priority Data

Nov. 4, 1997 [JP] Japan ................................ 9-302158

[51] Int. Cl.$^7$ ........................................... G11B 11/00
[52] U.S. Cl. ................................................... 369/13
[58] Field of Search ............................ 369/13, 14, 116, 369/110; 360/59, 114

[56] References Cited

U.S. PATENT DOCUMENTS

| | | | |
|---|---|---|---|
| 5,953,289 | 9/1999 | Miyaoka | 369/13 |
| 5,956,296 | 9/1999 | Yamamoto et al. | 369/13 |
| 5,966,349 | 10/1999 | Suwabe et al. | 369/13 |

*Primary Examiner*—Tan Dinh
*Attorney, Agent, or Firm*—Banner & Witcoff, Ltd.

[57] ABSTRACT

A magneto-optically recorded data readout system for the readout of a data pit recorded on a magneto-optical recording medium comprising a memory layer, a switching layer and a displacement layer, said system comprising a means for magnetic domain expansion of said data pit for readout. By which means the recording medium is irradiated and heated with a pulsed laser beam of light such that a domain wall of said data pit can be displaced in the displacement layer and wherein the frequency of the laser beam of light is higher than the highest frequency of the data pit.

3 Claims, 5 Drawing Sheets

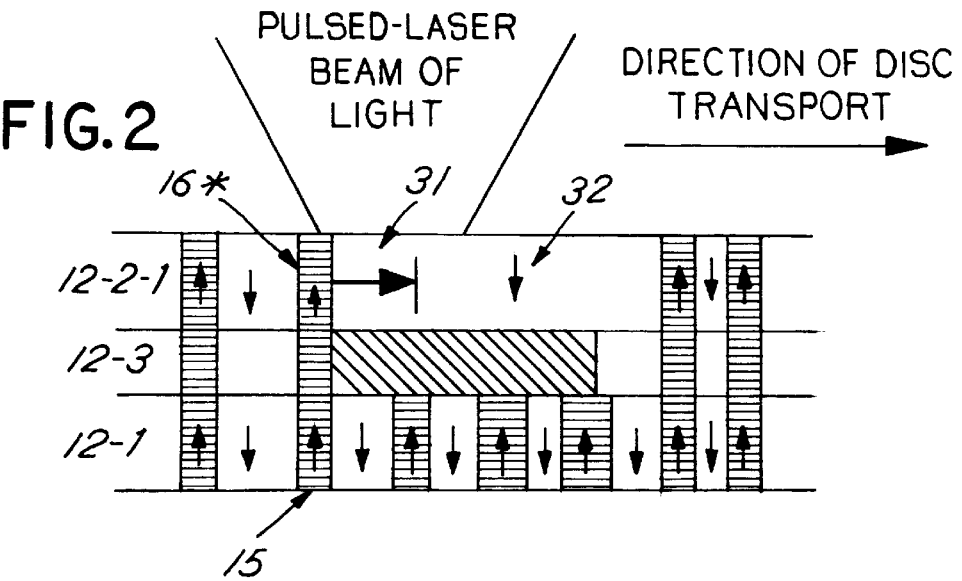
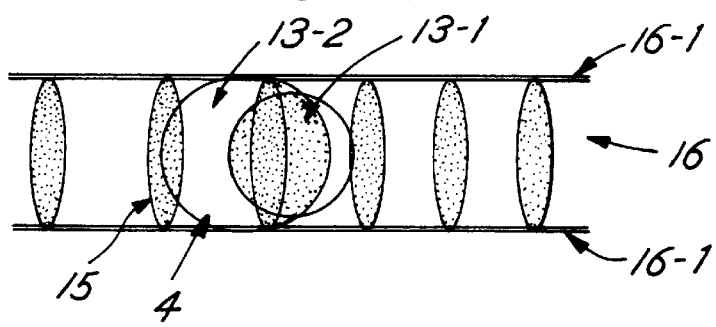
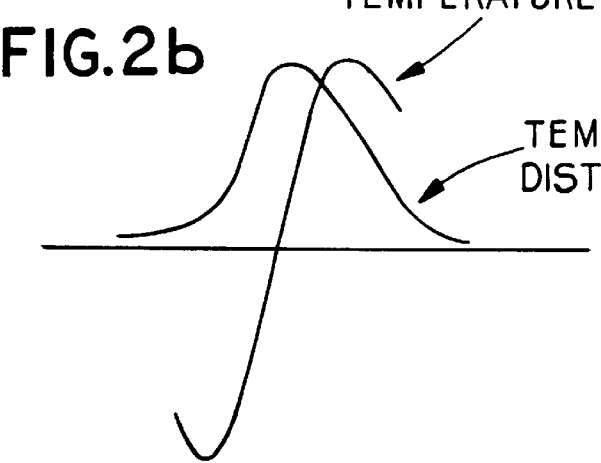

MAGNETO-OPTICALLY RECORDED DATA READOUT SYSTEM

BACKGROUND OF THE INVENTION

1. Field of the Invention

The invention relates to magneto-optical recording media and apparatus for the readout of magneto-optically recorded data on the magneto-optical recording media.

2. Description of the Related Art

Currently, when information is recorded by a magneto-optical disc apparatus, a laser beam of light is typically focused by a lens on the disc as a spot having a wavelength at the order of the diffraction limit, while modulating the intensity of the laser beam by a code data signal to be recorded, for example. As a result, the temperature of the magnetic recording media such as the RE-TM amorphous thin film alloy, which is an alloy of amorphous rare earth metal and a transition metal such as Te-Fe-Co or Gd-Tb-Fe, is increased to 150–200 degrees centigrade. As the recording medium is irradiated and heated by the laser, the temperature of the media increases beyond the Curie temperature (Tc), and the coercivity of the media is lost. By applying a magnetic bias field in a certain direction by a magnet, a magnetization reversal occurs and a magnetic domain is recorded after the heated portion returns to room temperature.

On the other hand, the readout of the code data thus recorded on the disc is performed by focusing a laser beam of light having a certain output power on the disc. As the focused spot of light is reflected by the magneto-optical recording media surface, the polarization of the laser beam is varied by the Kerr effect, so that by detecting optically the variation in polarization of the reflected light, information of the magnetization recorded on the disc can be read.

The aforementioned techniques have been utilized in the 3.5 or 5.25 inch magneto-optical disc drives according to the ISO standard. The diameter D of the focused optical spot can be theoretically expressed by an equation $D=0.5\lambda/NA$, where $\lambda$ is the wavelength of the laser and NA is the numerical aperture of the lens. If a semiconductor laser with the wavelength $\lambda$ of 0.68 $\mu$m and the lens numerical aperture NA of 0.55 is used, for example, the optical spot diameter D would be 0.6 $\mu$m, and readout of magnetic data smaller than this diameter would be very difficult.

For example, JP Pat. Appln. Disclosure No. 3-93056 and a journal "Magnetically Induced Super Resolution Optical Disk" of the Magnetic Society of Japan, 15-5, pp. 838–844 (1991), disclose a method of reading out magnetic data d smaller than the optical spot diameter D, by which method a rotating disc is scanned by a laser beam of light with slightly larger power than for the ordinary readout in order to take advantage of the temperature distribution in the magnetic media within the irradiated light spot region on the disc surface. This technique is a magnetically induced super resolution technique called FAD (Front Aperture Detection) method. The FAD method, however, has disadvantages such as requiring a large DC magnetic field during readout, and therefore has not been established as a practical method of data readout.

The problems of the prior art will be explained by referring to this magneto-optical disc recording system utilizing the laser pulse irradiation and magnetic field modulation, and the method of reproducing such recording as shown in FIGS. 3 and 4.

In FIG. 5(*a*), a laser diode 1 is driven by a laser driver 9 in accordance with a clock signal 10 reproduced and generated from a phase pit mark on the magneto-optical recording disc 8. The resultant pulsed light (whose waveform is indicated at 2) is irradiated onto the magneto-optical recording medium 8 as an optical spot 4 by an objective lens 3. A modulated magnetic field 7 is formed by a data signal generator 6 using a magnetic head 5 arranged near the disc. The optical spot 4 is focused and irradiated onto the disc surface and the pulsed laser beam 2 in synchronization with the clock 10 and the modulated magnetic field 7 are combined, whereby irradiation spots 4 are written in an overlapping manner and a crescent shaped magnetic domain 11 which has a smaller mark length than the optical spot diameter D can be recorded. This method is known from JP Pat. Appln. Disclosure No. 1-292603. When the laser wavelength $\lambda$ is 0.68 $\mu$m and the lens numerical aperture NA is 0.55, the focused optical spot diameter D will be 0.62 $\mu$m. By reducing the pulse irradiating interval, a crescent shaped magnetic domain with a short mark length $d=0.1$ to $0.2$ $\mu$m and the mark width substantially equal to the optical spot diameter D can be recorded. In a disc with the diameter of 120 mm, if the track pitch p is set to 0.6 $\mu$m and the shortest mark length d to 0.26 $\mu$m, seven to ten GB (Giga bytes) capacity of information can be recorded. However, such magnetic data with the shortest mark length $d=0.1$ to $0.2$ $\mu$m is extremely difficult to reproduce with a focused spot with a diameter $D=0.62$ $\mu$m ($D=0.5$ $\lambda/NA$).

FIG. 4 is for the explanation of the FAD (Front Aperture Detection) system whereby magnetic pits smaller than the optical spot 4 can be read using an MSR (Magnetically Induced Super Resolution) method. This technique is known from JP Pat. Appln. Disclosure No. 3-930567 or the already-mentioned journal of the Magnetics Society of Japan, 15-5, pp. 838–844 (1991) "Magnetically Induced Super Resolution Optical Disk." In FIG. 4(*a*), an opto-magnetic medium 12 comprises three layers having different magnetic and temperature characteristics, i.e., a memory layer 12-1, a read-out layer 12-2, and a switching layer 12-3. As shown in FIG. 4(*b*), as an optical spot 4 scans a track on the magnetic media surface 12 where magnetic data 15, 15-1 are recorded, the optical energy is absorbed by the magnetic recording medium and there results a temperature distribution in the magnetic recording medium within the spot. As a result, in a high temperature region 13-1 of the switching layer 12-3 where the temperature is above the Curie temperature Tc=140 degrees centigrade, the coercivity of the switching layer disappears and thus the exchange-coupling between the memory layer and read-out layer is lost. Upon the application of a readout magnetic field Hr, the magnetization directions of the read-out layer 12-2 with a smaller coercivity are aligned by the readout magnetic field Hr. Accordingly, the magnetized pit 15-1 in the high temperature region 13-1 on the memory layer where the optical spot is irradiated is masked, so that only the magnetized pit 13 in the low temperature region 13-2 can be transferred and read out. This system, however, reads the chevron-shaped low temperature region, and although a career to noise (C/N) level of 45 dB can be achieved with respect to the 0.4 $\mu$m mark length, as the mark length becomes 0.3 $\mu$m, for example, the career to noise level decreases down to 30 dB. Furthermore, since the mask shape in the reproduced region becomes an inversed-chevron shape as mentioned above, the disadvantage arises that as the track pitch is reduced, a leakage of reproduced signal from a neighboring track becomes significant and therefore the track density cannot be improved.

Referring now to FIG. 3, the DWDD (Domain Wall Displacement Detection) system as known from a journal of the MORIS/ISOM Society "High Density Magneto-Optical Recording with Domain Wall Displacement Detection," Tu-E-0438-38(1997) and JP Pat. Appln. Disclosure No. 6-290496 will be explained.

FIG. 3(a) shows the structure of the magnetic medium 12 according to the DWDD system, which comprises a memory layer 12-1, a displacement layer 12-2-2, and a switching layer 12-3. In the DWDD system, as the laser is irradiated, a temperature gradient is formed along the movement of the spot. As a result, as the temperature of the magnetic layer of the switching layer exceeds the Curie temperature, the switching layer loses its coercivity and the exchange coupling between the memory layer 12-1 and the displacement layer 12-2-1 is weakened, which causes the domain wall formed in the high temperature region in the displacement layer to move along the temperature gradient, and the recorded information can be reproduced by detecting the changes in the polarization of the reflected optical beam. More specifically, in FIG. 3(a), as the track in which magnetic information is recorded is scanned by a DC irradiation of the laser, the optical energy is absorbed by the magnetic medium and there appears a temperature distribution in the magnetic medium within the spot 4 as shown in FIG. 3(b). Consequently, in the high temperature region 13-1 (as indicated by the hatching), where the temperature is above the Curie temperature Tc=140 degrees centigrade of the switching layer, the exchange-coupling between the memory layer and read-out layer is lost. On the other hand, in a region of the switching layer where the temperature is below the Tc, the memory layer exhibits a large frictional force due to the exchange-coupling.

Referring to FIG. 3(b), the gradient of the temperature distribution in the displacement layer theoretically corresponds, as explained in JP Pat. Appln. Disclosure No. 6-290496, to the force by which the domain wall is displaced. Accordingly upon the laser irradiation the magneto wall formed in the high temperature region of the displacement layer is drawn in a direction of larger temperature gradient, and as a result the minute magnetic domain 15 in the memory layer is extended in the displacement layer, thereby allowing the magnetic pits in the memory layer to be read as a large readout output signal by the extension of the displacement layer. The DWDD Method can reproduce smaller minute magnetic domain than can the FAD method; however, this method utilizes a temperature gradient which is less steep, as shown in FIG. 3(b), in the high temperature region, the force by which the magnetic wall in the displacement layer is moved is weak and thus the domain wall displacement cannot go smoothly. Further, as discussed in "High Density Magneto-Optical Recording with Domain Wall Displacement Detection" by the MORIS/ISOM Society, Tu-E-0438-38 (1997), this laser DC readout system, in which the temperature gradient is gentle, results in a slower velocity in the movement of the domain wall, thereby causing a ghost image to appear in the reproduced waveform and preventing an accurate readout of the data in the memory layer. In order to eliminate this ghost image, a large read out DC magnetic field of the order of several hundred oersted is required for readout and this posed a problem similar to the aforementioned FAD method.

SUMMARY OF THE INVENTION

The object of the invention is to provide a magneto-optically recorded data readout apparatus whereby a magnetic pit far smaller than the optical spot can be stably reproduced.

Another object of the present invention is to provide an apparatus for the readout of a crescent shaped magnetic domain which is smaller than the wavelength of the laser. For the readout of the crescent shaped magnetic domain recorded on the disc, a disc with deep grooves is used which disc is irradiated and heated with a laser beam of light whereby a domain wall motion takes place in the crescent shaped magnetic domain in the displacement layer and the crescent shaped magnetic domain is magnetically expanded for readout.

These and other objects, advantages and features of the invention will be set forth in the detailed description which follows.

BRIEF DESCRIPTION OF THE DRAWINGS

In the detailed description which follows, reference will be made to the drawings comprised of the following figures:

FIG. 2(a,b) shows a track and deep grooves on either side of the track for the purpose of explaining the readout of a crescent shaped magnetic domain by the pulsed irradiation of a laser beam of light on the disc, the disc having been recorded by the laser pulse irradiated magnetic field modulation recording method;

DETAILED DESCRIPTION OF THE INVENTION

Figure 1A:
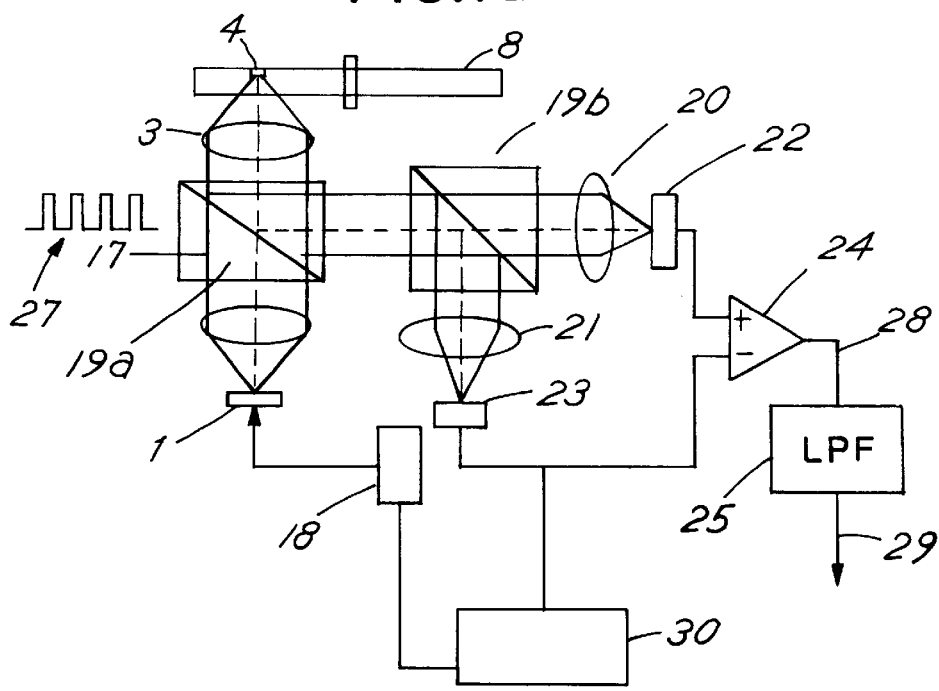
FIG. 1(a,b) shows an optical system and a signal processing block diagram according to an embodiment of the invention.

In accordance with the invention, in the readout of a recorded data pit in a memory layer on a disc wherein 1) a deep groove is formed on the disc between adjacent tracks; 2) the magneto-optical recording layer is comprised of a memory layer, a displacement layer and a switching layer; and 3) the data signal is recorded with a large width along the tracks by the laser pulse irradiated magnetic field modulation recording method, the invention characterized in that 4) the recording disc is irradiated by a pulsed laser beam of light and thereby heated, thus making the temperature gradient greater, whereby the movement of the domain wall in the displacement layer is facilitated and thus the domain expansion of the recorded data pits in the memory layer can take place for readout.

Further, in accordance with the invention, a photo-electric converting element for receiving laser beam of light reflected from the magneto-optical recording medium, and a means of low-pass filtering the output of the photo-electric converting element.

An embodiment of the invention will be described by referring to the drawings.

Figure 1B:
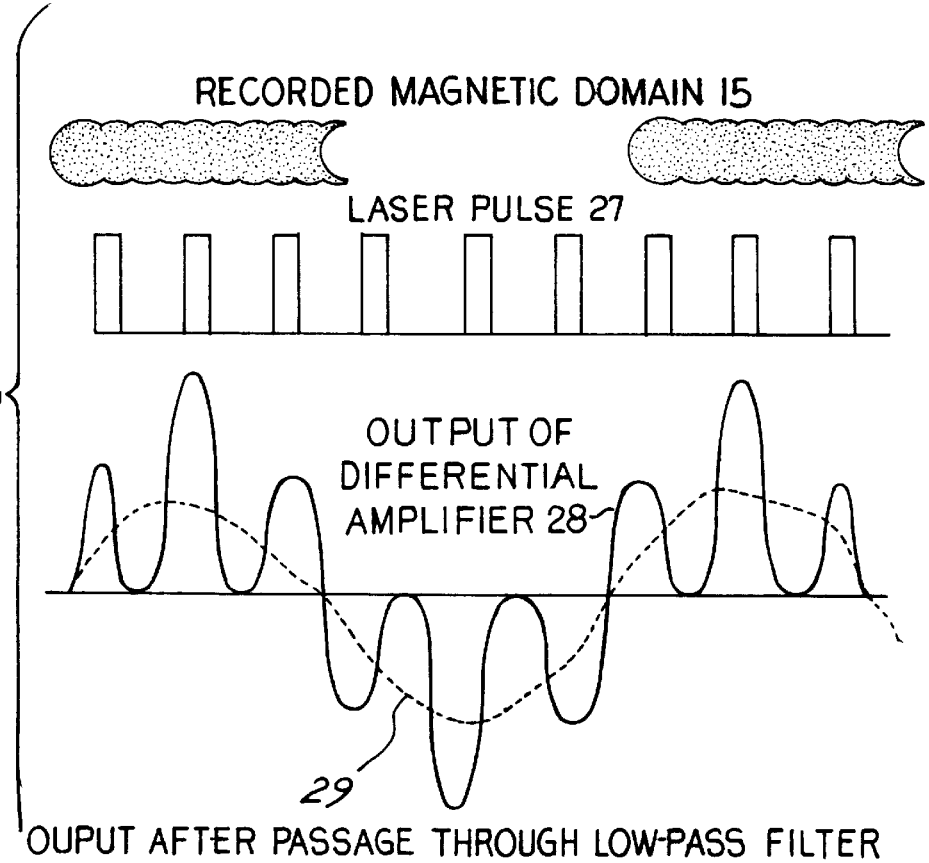
Figure 5A:
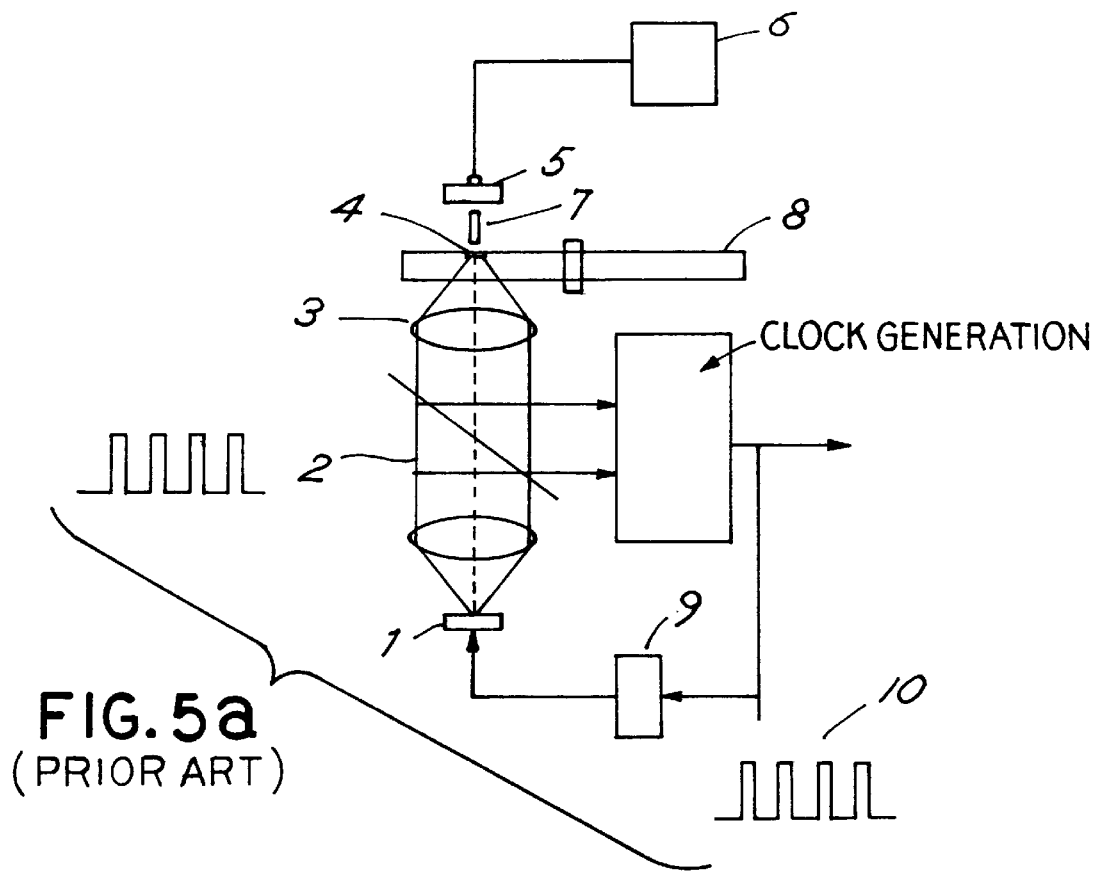
FIG. 5(a,b) shows diagrams for the explanation of the laser pulse irradiated magnetic field modulation recording method.
Figure 5B:
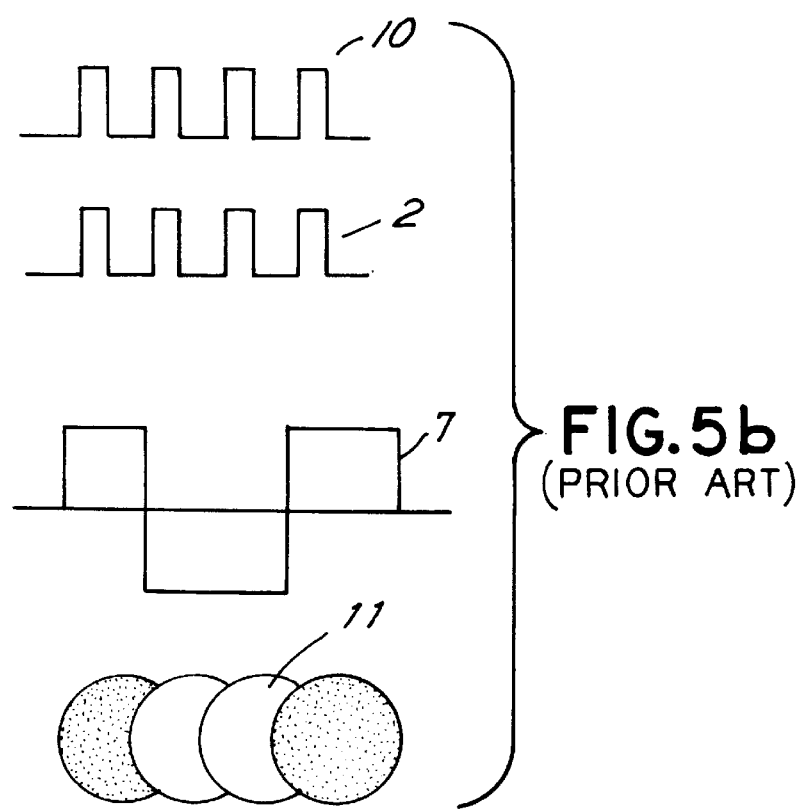

FIG. 1 shows an embodiment of the optical data readout apparatus in a magneto-optical data apparatus according to the invention. In FIG. 1(a), a laser device 1 is formed by a laser diode with a wavelength λ=0.68 μm, for example. The laser device 1 emits a beam of light in a pulsed manner onto a magnetic medium 8 by means of a laser pulse drive 18. The pulse by which the laser device 1 is driven to emit a laser waveform 27 may be generated within the laser pulse driver 18 or in a clock generating circuit 30 on the basis of information from the disc 8, as shown in FIG. 1. A DC biasing component may be superposed on the laser pulse waveform 27, although in the embodiment of FIG. 1 it is not shown. The frequency of the laser pulse may be driven at a frequency higher than the highest frequency of the magnetic data. The pulsed laser beam 17 is focused to the diffraction limit by an objective lens 3 onto the magnetic medium 8. The numerical aperture of the lens is not limited to any particular number but it is advantageously be in teh range from 0.6 to 0.9. The focused spot of light 4 is reflected by the magnetic medium on the disc surface and then retransmitted by the objective lens 3. It is reflected by the polarizing beam splitter 19a, and enters a polarizing beam splitter 19b which the p-polarized beam is transmitted and the s-polarized beam is reflected. The separated p- and s-polarized beams are focused onto photo-diode detectors 22, 23 by collimating lenses 20, 21 respectively. The photo-diode detectors 22, 23 convert the beams into electric signals which are applied to a differential amplifier 24. The output 28 of the differential amplifer 24 is passed through a low-pass filter 25 by which pulse-modulated undesired signals in the recording data are eliminated, wehreby the desired readout signal 29 is obtained. FIG. 1(b) shows the shape of the recorded magnetic data and the waveform during the readout of the data. In accordance with the invention, the magnetic data mark is recorded by the modulation of the magnetic field as shown in FIG. 5 and must be crescent shaped magnetic domain, as will be explained later. In FIG. 1(b), during the readout process, the output of the differential amplifier 28 comprises the signal to be reproduced on which a pulsed signal is superposed, and therefore the output as it is cannot be utilized as the recorded signal. The desired readout signal 29 is obtained only after smoothing the pulse modulation signal, which exists with a higher frequency than the highest frequency of the recorded signal, by a low-pass filter 25.

By referring to FIG. 2, the method of readout of the magnetic medium 8 by the magnetooptical data readout apparatus as shown in FIG. 1(a) embodying the invention will be described. In FIG. 2(a), the magnetic layer on the disc medium 12 comprises three layers with different opto-magnetic characteristics. They are a memory layer 12-1 of e.g. TbFeCo, a displacement layer 12-2-1- of e.g. GdFe, and a switching layer 12-3 of e.g. GdFeCo; however, the structure of the magnetic layer is not limited thereto and other known structures may be used. In FIG. 2, the arrow in the vertical direction indicates the direction of magnetization.

In FIG. 2(a), the pulsed laser beam of light 27 formed by the readout optical system of FIG. 1 is focused onto the data recording track 16 on the disc surface as an optical spot 4. The magnetic layer 12 is irradiated and scanned by this optical spot 4, whereby the laser energy is absorbed by the magnetic medium and there arises due to the pulsed laser beam of light a temperature distribution with a large heat gradient as shown in FIG. 2(b). The heat gradient in the magnetic layer by the pulsed laser beam of light is by far larger than is the case by the DC irradiation of the laser as in the conventional example of FIG. 3. As a result, in a region where the temperature is above the Curie temperature Tc, the coercivity in the switching layer is lost and thus the exchange coupling between the memory layer 12-1 and displacement layer 12-2-1 is weakened, so that the displacement layer 12-2-1 is not influenced by the memory layer anymore due to the switching layer 12-3. In addition, according to the invention, the optical spot 4 is pulsed as shown in FIG. 2(a), so that in the region of the switching layer 12-3 where the temperature is above the Curie temperature Tc, the displacement layer 12-2-1 has a steeper temperature gradient. Consequently, the temperature gradient generates a driving force which acts on the domain wall of the higher temperature region in the displacement layer 12-2-1 such that the domain wall is drawn towards the higher temperature gradient direction, thereby causing the magnetic pit 15* to be expanded for readout. It is preferable that the pulsed irradiation of the laser be carried out at higher frequency than the highest frequency of the data recorded on the opto-magnetic disc.

In accordance with the invention, a disc is used which is constructed such that a deep groove 16-1 is provided between adjacent tracks on the disc. Further, the recording of data on the track must be carried out by irradiatinig and heating the disc by pulsed laser beam while modulating the magnetic field, such that the crescent shaped magnetic domain is recorded to the fullest width of the track. As the disc having a deep groove structure and on which data are recorded in a manner as explained above is reproduced by the irradiation of the laser pulse, the domain wall can be more easily moved in the region of the displacement layer 12-2-1 where the temperature is above the Curie temeprature Tc. In the case of the conventional optical modulation recording method as used in the 5.25 inch opto-magnetic discs, by which method the laser beam of light is modulated by the data, no such movement of the domain wall can take place in the displacement layer.

Figure 3A:
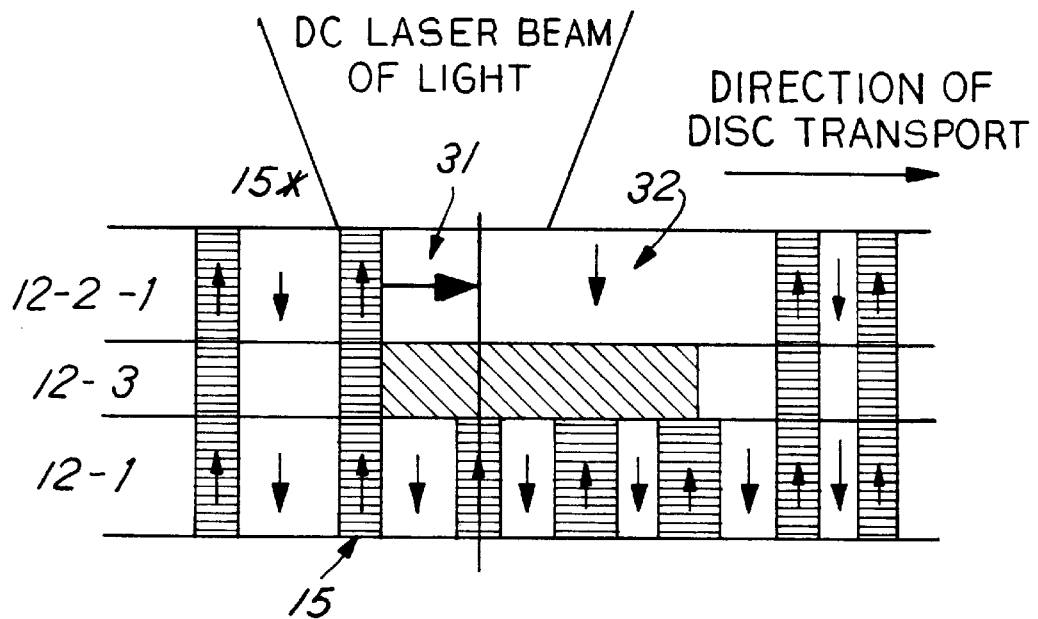
FIG. 3(a,b) is a diagram for the explanation of the readout of the recorded magnetic pit by the DWDD (Domain Wall Displacement Detection) method.
Figure 3B:
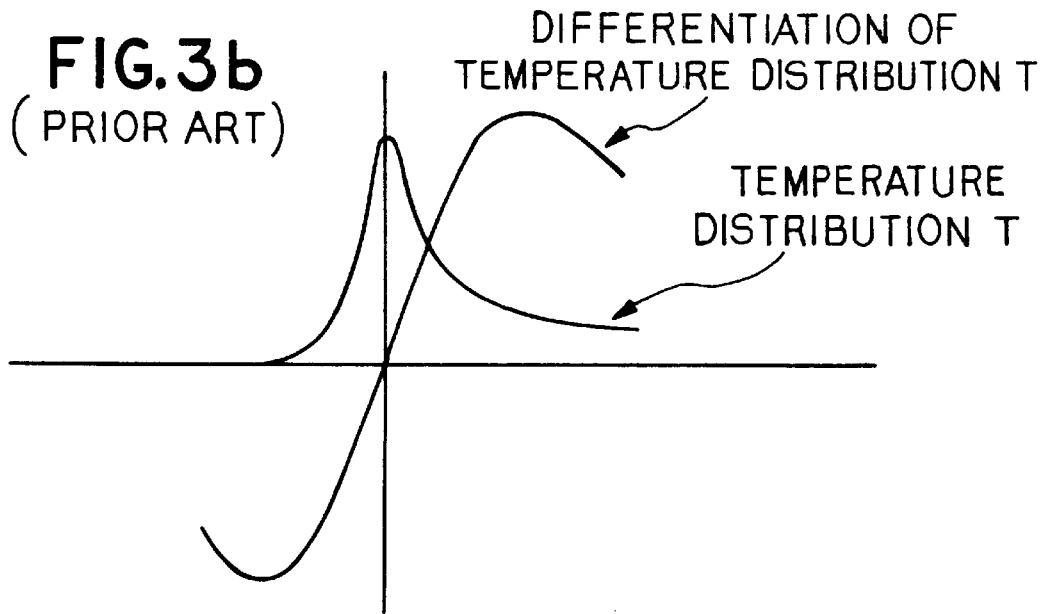
Figure 4A:
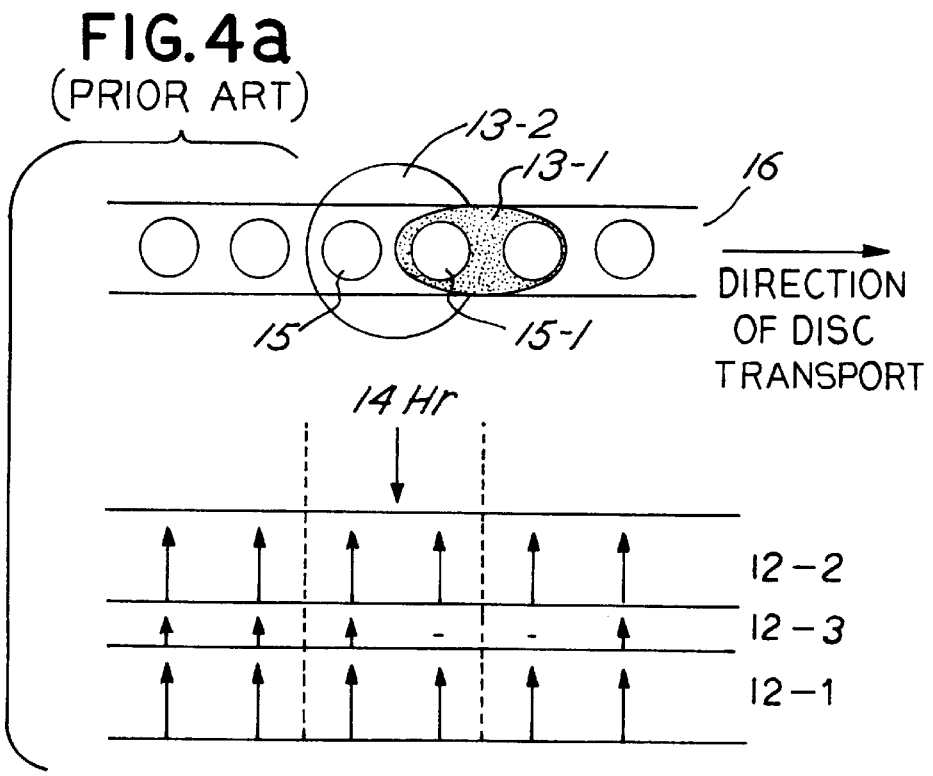
FIG. 4(a,b) is a diagram for the explanation of the readout of the magnetic pit by the FAD (Front Aperture Detection) method.
Figure 4B:
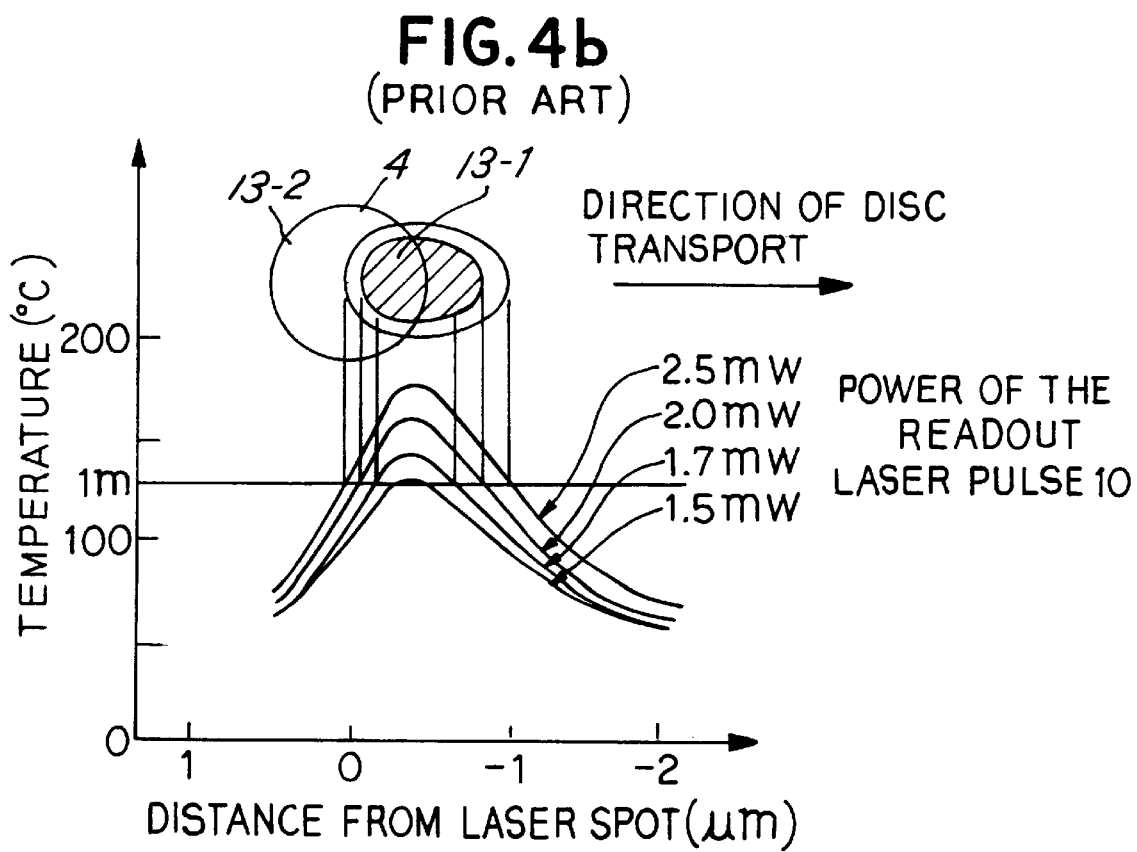

Thus, in accordance with the invention, a greater gradient can be obtained in the temperature distribution layer by the irradiation of a pulsed laser beam of light also during readout. Further, the deep groove 16-1 is provided on either side of the track 16. Consequently, as compared with the DWDD method utilizing the DC irradiation of the laser as shown in FIG. 3, the movement of the domain wall in the displacement layer can take place more smoothly. Therefore, the crescent shaped magnetic domain 15, which is far smaller than the optical spot 4, can be accurately read out by virtue of the magnetic domain expansion.

In accordance with the invention, the readout of an opto-magnetic disc with the deep-groove structure, in which disc data is recorded by the laser pulse irradiated magnetic field modulation recording method, is carried out by irradiating and heating the disc with a pulsed laser beam of light such that the domain wall in the high temperature region of the displacement layer is moved, thereby allowing the crescent shaped magnetic domain to be magnetically expanded for stable readout of high density magnetic recording information.

Thus, while there has been described a preferred embodiment of the invention, it is to be understood that the invention is to be limited only by the following claims and equivalents thereof.

What is claimed is:

1. A magneto-optically recorded data readout system for the readout of a data pit having a frequency and being recorded on a magneto-optical recording medium comprising: a memory layer, a switching layer and a displacement layer, said system comprising a means for magnetic domain expansion of said data pit for readout, by which means said medium is irradiated and heated with a pulsed laser beam of light such that a domain wall of said data pit is displaced in said displacement layer, the laser beam of light having a frequency higher than the highest frequency of the data pit.

2. A magneto-optically recorded data readout system according to claim 1, wherein said magneto-optical recording medium comprises a deep groove provided between adjacent tracks which facilitates the displacement of said domain wall in said displacement layer, and wherein data is recorded on said magneto-optical recording medium for having a wide width along the radial directions by irradiating and heating the medium with a pulsed laser beam of light while modulating a magnetic field with a recording data signal.

3. A magneto-optically recorded data readout system according to claim 1, further comprising a photo-electric converting element for receiving the pulsed laser beam of light as reflected by said magneto-optical recording medium, and a means of low-pass filtering the output of said photo-electric converting element.

* * * * *